Sept. 21, 1965   J. M. FRAME   3,207,469
HIGH VACUUM VALVE
Filed Feb. 25, 1963
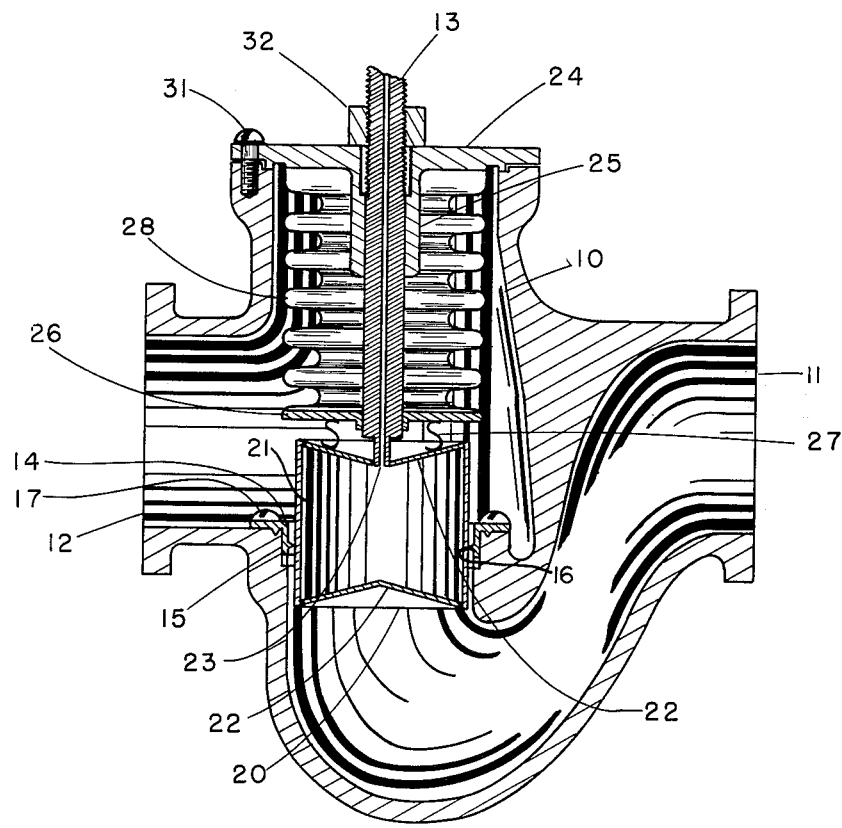
INVENTOR.
JAMES M. FRAME

United States Patent Office 3,207,469
Patented Sept. 21, 1965

3,207,469
HIGH VACUUM VALVE
James M. Frame, Forestville, Md., assignor to the United States of America as represented by the Secretary of the Navy
Filed Feb. 25, 1963, Ser. No. 260,928
1 Claim. (Cl. 251—175)
(Granted under Title 35, U.S. Code (1952), sec. 266)

The invention described herein may be manufactured and used by or for the Government of the United States of America for governmental purposes without the payment of any royalties thereon or therefor.

The present invention relates to vacuum type valves and more particularly to a vacuum valve having a metal-to-metal seal and suitable for remote automatic operation.

Heretofore metal-to-metal seat valves have been made which employ a knife-edge against which a soft metal gasket is pressed by means of a plate attached to the stem or in some cases the arrangement is reversed. Such valves have their drawbacks and have a short life. The knife-edge always seats in the same relative spot which requires different pressures and judgment each time the valve is closed to prevent ruining the gasket seat. With the best of care these gasket seats have a short life which requires periodic replacement. Extra care must be taken to prevent leakage especially during thermal cycling and the valves are not suitable for remote operation.

It is therefore an object of the present invention to provide a metal-to-metal vacuum valve having long life suitable for remote control and operable over a wide range of thermal cycling for long periods of time.

Another object is to provide a vacuum valve having a seat contact area which is adjustable over a wide range of movability.

Still another object is to provide a metal-to-metal valve which has a separate stem travel mechanism and seat force applying means.

Other objects and advantages of the invention will hereinafter become more fully apparent from the following description of the annexed drawing, which illustrates a preferred embodiment and wherein the drawing illustrates a cross sectional view of a preferred embodiment of the invention.

The present invention is directed to a metal-to-metal seal vacuum valve provided with a bellows which aids in preventing leakage through the housing cover and about the stem. The inner surface of the valve housing is provided with a metal valve seat having a relatively sharp edge around the inner surface. The valve or sealing element is formed of a closed cylindrical chamber having conical ends which are concaved toward each other and designed to permit the chamber to expand radially outwardly under a fluid pressure. Fluid (hydraulic or pneumatic) under pressure is admitted into the cylindrical chamber through the valve stem forcing the conical ends outwardly along the cylindrical axis and simultaneously forces the cylindrical chamber wall radially against the valve seat. A nut screw-threaded onto the valve stem can be adjusted to position the cylindrical chamber at various positions to provide different seating contacts between the valve seat and the cylindrical chamber.

Now referring to the drawing there is shown by illustration a metal-to-metal valve 10 which comprises an inlet 11 and an outlet 12 in alignment on opposite sides of the valve. The inlet extends into a passage which takes the shape of an S which connects with the outlet at a right angle therewith or in a line parallel with a valve stem 13. A valve seat 14 is formed of perpendicular portions with one portion extending downwardly along the inlet passage and the other along the outlet wall portion. The downwardly extending perpendicular portion seats in a cutout 15 in the wall such that the valve seat portion makes a smooth continuous surface with the passage wall of the valve. The valve seat is provided with a sharp knife-edge 16 along the inner perimeter of the downwardly extending portion and the valve seat insert is secured to the outlet side of the valve by suitable screws 17.

A metallic sealing member 20 cooperates with the valve seat to seal the passage between the inlet and the outlet. The sealing member is formed of a cylindrical metal chamber 21 which is provided with conical ends 22 designed to be forced away from each other axially of the chamber by a fluid pressure, either pneumatic or hydraulic. The upper conical end has an aperture 23 therein at the center thereof. A valve stem 13 is rigidly connected thereto by screw threads or any other suitable manner. The valve stem extends upwardly through a valve cover 24 and is provided with an axial passage through which the fluid under pressure is admitted into the sealing member 20. The cover is provided with a non-threaded portion 25 that extends downwardly along the valve stem which functions as a guide for the valve stem and sealing member. A plate 26 is secured to the valve stem just above the connection to the sealing member and is spaced therefrom by spring type spacers 27. A bellows 28 is connected at one end to the plate 26 and the opposite end is secured between the cover 24 and the valve body. The cover is secured to the body by suitable screws 31. The bellows prevents any leakage between the valve stem and the aperture in the cover through which the valve stem passes.

The position of the sealing member relative to the valve seat 16 is adjustable by a nut 32 which is screw-threaded onto the valve stem above the cover 24. As the valve stem moves the sealing member downwardly in the passage about which the valve seat is secured, the nut 32 will rest against the cover to position the sealing member at a specific position. The point of contact between the valve seat and the sealing member is changed by rotation of the nut 32. The valve stem can be connected to any suitable means for lowering and raising the sealing member since the stem moves freely relative to the valve cover. Thus the valve is suitable for remote control operation.

In operation, assuming the valve to be open and it is desired to close the valve, no fluid pressure will be applied to the sealing member chamber, therefore the chamber will be in its relaxed normal condition. The valve stem is lowered until the nut 32 rests upon the cover. This lowers the sealing member into position relative to the valve seat 16. (The relative position is dictated by the nut 32.) Fluid pressure is applied within the cylindrical chamber or sealing member through valve stem 13 which applies an axial force on the conical end members and a radial force on the chamber which in effect expands the chamber radially. Radial expansion of the pressure chamber forces the chamber wall against the valve seat in a vacuum tight seal. The bellows prevents any vacuum leakage about the valve stem and the pressure applied to the inside of the cylindrical chamber maintains a vacuum seal between the valve seat and the sealing member for as long a period as the fluid pressure is applied within the metallic chamber 20.

Opening of the valve is carried out by releasing the pressure from within the cylindrical chamber which permits the conical ends and cylindrical chamber to return to their normal positions with the cylindrical member out-of-contact with the valve seat. The valve stem is then raised which raises the cylindrical member from the passage between the inlet and outlet.

Since rotation of the adjusting nut 32 determines the relative position between the valve seat and the sealing member, the valve stem could be provided with some means to indicate the point of contact between the valve seat and the sealing member. Thus, it can be seen just where a sealing contact is made. Therefore such a valve can be used many times and by adjusting the contact point between the sealing member and the valve seal such a valve will have a very long life. Also, the valve will maintain a vacuum seal between the seat and the sealing member for long periods of time.

Obviously many modifications and variations of the present invention are possible in the light of the above teachings. It is therefore to be understood that within the scope of the appended claims the invention may be practiced otherwise than as specifically described.

What is claimed is:

A vacuum valve having a metal-to-metal seat which comprises:
(a) a valve body,
(b) an inlet and outlet oppositely disposed in said body, a passage between said inlet and outlet,
(c) said passage joining said outlet at a right angle thereto,
(d) a valve seat insert secured to said passage at said outlet,
(e) a sharp pointed cylindrical valve seat on said insert,
(f) a sealing member within said valve body adapted to be positioned in an open position removed from said passage and moved into said passage into a closed position, said sealing member having a metallic cylindrical wall with conical end sections connected with said cylindrical wall to form a fluid chamber with the apex ends of said conical end sections facing each other,
(g) an aperture in one of said conical end sections,
(h) a valve stem connected to said conical end section at said aperture for controlling the position of said sealing member relative to said sharp pointed cylindrical valve seat,
(i) an axial passage through said valve stem connecting with said aperture in said conical end section for admitting a fluid under pressure into said sealing member to force said sealing member into a vacuum tight seal with said knife-edge valve seat,
(j) an adjustable nut screw-threaded onto said valve stem for determining a relative position between said sealing member and said valve seat, and
(k) a bellows connected at one end to a plate on said valve stem near the sealing member and secured at the cover of said valve body at an opposite end to prevent leakage between said cover and said valve stem.

References Cited by the Examiner

UNITED STATES PATENTS

| | | | |
|---|---|---|---|
| 613,623 | 11/98 | Dolan | 251—361 X |
| 2,476,711 | 7/49 | Edwards | 251—175 |
| 2,582,877 | 1/52 | Mekler | 251—175 |
| 2,883,147 | 4/59 | Mirza et al. | 251—172 |
| 3,022,977 | 2/62 | Jones | 251—61 |
| 3,076,470 | 2/63 | Langdon | 251—285 X |
| 3,115,329 | 12/63 | Wing et al. | 251—191 X |

FOREIGN PATENTS

| | | |
|---|---|---|
| 78,856 | 1/55 | Denmark. |
| 898,352 | 6/62 | Great Britain. |
| 561,219 | 4/57 | Italy. |

M. CARY NELSON, *Primary Examiner.*

LAVERNE D. GEIGER, *Examiner.*